US012103805B2

(12) United States Patent
Takahashi et al.

(10) Patent No.: US 12,103,805 B2
(45) Date of Patent: Oct. 1, 2024

(54) MEDIUM PLACEMENT DEVICE AND RECORDING SYSTEM

(71) Applicant: Seiko Epson Corporation, Tokyo (JP)

(72) Inventors: Haruna Takahashi, Ina (JP); Mio Yashita, Shiojiri (JP); Masaki Namiki, Kitakyushu (JP); Shun Ito, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 312 days.

(21) Appl. No.: 17/505,151

(22) Filed: Oct. 19, 2021

(65) Prior Publication Data

US 2022/0127096 A1 Apr. 28, 2022

(30) Foreign Application Priority Data

Oct. 22, 2020 (JP) ................................ 2020-177405

(51) Int. Cl.
*B65H 31/26* (2006.01)
*B41J 11/70* (2006.01)
(Continued)

(52) U.S. Cl.
CPC .......... *B65H 35/0006* (2013.01); *B41J 11/70* (2013.01); *B65H 29/16* (2013.01); (Continued)

(58) Field of Classification Search
CPC ...... B65H 35/006; B65H 29/16; B65H 29/20; B65H 31/02; B65H 31/22; B65H 31/26; (Continued)

(56) References Cited

U.S. PATENT DOCUMENTS 2,991,999 A * 7/1961 Doerner ................. B65H 31/26 271/220
5,197,728 A * 3/1993 Radtke .................. B65H 29/52 271/220
(Continued)

FOREIGN PATENT DOCUMENTS

JP 2002-211821 7/2002
JP 2011-116478 6/2011
(Continued)

*Primary Examiner* — Thomas A Morrison
(74) *Attorney, Agent, or Firm* — WORKMAN NYDEGGER

(57) ABSTRACT

A medium placement device configured to have a medium discharged from a discharge unit of a processing device placed therein, and includes: a placement unit including a plurality of placement surfaces, with different angles with respect to a horizontal direction, that are disposed along a discharge direction of the medium, the placement unit being configured to have the medium discharged from the discharge unit placed thereon; and a plurality of restricting members disposed facing the placement unit along the discharge direction, the plurality of restricting members being configured to come into contact with the medium from above. In an initial state in which the medium is not placed, a distance in a gravitational direction between a first end of each of the plurality of restricting members on a placement unit side and one of the plurality of placement surfaces that faces the first end in the gravitational direction is constant.

10 Claims, 7 Drawing Sheets

(51) Int. Cl.

| | |
|---|---|
| ***B65H 29/16*** | (2006.01) |
| ***B65H 29/20*** | (2006.01) |
| ***B65H 31/02*** | (2006.01) |
| ***B65H 31/22*** | (2006.01) |
| ***B65H 35/00*** | (2006.01) |

(52) U.S. Cl.
CPC ............. *B65H 29/20* (2013.01); *B65H 31/02* (2013.01); *B65H 31/22* (2013.01); *B65H 31/26* (2013.01); *B65H 35/008* (2013.01); *B65H 2701/11312* (2013.01)

(58) Field of Classification Search
CPC ......... B65H 35/008; B65H 2701/11312; B41J 11/70
See application file for complete search history.

(56) References Cited

U.S. PATENT DOCUMENTS

| | | | | |
|---|---|---|---|---|
| 6,032,948 | A * | 3/2000 | Peebles | B65H 31/20 271/224 |
| 9,718,284 | B2 | 8/2017 | Hirose | |
| 10,150,637 | B2 | 12/2018 | Wakayama et al. | |
| 10,723,148 | B2 | 7/2020 | Takeda et al. | |
| 2011/0042890 | A1 * | 2/2011 | Lee | B65H 31/02 271/220 |
| 2014/0291921 | A1 * | 10/2014 | Kobayashi | B65H 31/36 271/220 |
| 2016/0090262 | A1 * | 3/2016 | Wakayama | B65H 31/26 271/223 |
| 2016/0288537 | A1 | 10/2016 | Hirose | |
| 2017/0066616 | A1 * | 3/2017 | Endo | B65H 45/18 |
| 2017/0248888 | A1 * | 8/2017 | Izumichi | B65H 31/02 |
| 2017/0275124 | A1 | 9/2017 | Wakayama et al. | |
| 2019/0143719 | A1 | 5/2019 | Takeda et al. | |

FOREIGN PATENT DOCUMENTS

| | | |
|---|---|---|
| JP | 2016-003129 | 1/2016 |
| JP | 2016-069137 | 5/2016 |
| JP | 2016-190705 | 11/2016 |
| JP | 2019-089659 | 6/2019 |

* cited by examiner

MEDIUM PLACEMENT DEVICE AND RECORDING SYSTEM

The present application is based on, and claims priority from JP Application Serial Number 2020-177405, filed Oct. 22, 2020, the disclosure of which is hereby incorporated by reference herein in its entirety.

BACKGROUND

1. Technical Field

The present disclosure relates to a medium placement device and a recording system.

2. Related Art

To date, as illustrated in JP-A-2002-211821, a recording device including a receiving device, with the receiving device configured to receive a recording medium discharged from a discharge unit, is known.

However, when the recording medium wound in a roll shape is cut in the above-described recording device and discharged from the discharge unit, the recording medium has a curl to it and thus is placed on a placement surface of the receiving device in a curled state with an upwardly convex shape, for example.

Thus, in a case in which the next recording medium is outputted from the discharge unit in this state, when the recording medium outputted next comes to abut on the already placed recording medium, the placement position of the recording media is prone to be shifted, causing a transport jam or stacking failure.

SUMMARY

A medium placement device is a medium placement device configured to have a medium discharged from a discharge unit of a processing device placed therein, the medium placement device including: a placement unit including a plurality of placement surfaces, with different angles with respect to a horizontal direction, that are disposed along a discharge direction of the medium, the placement unit being configured to have the medium discharged from the discharge unit placed thereon, and a plurality of restricting members disposed facing the placement unit along the discharge direction, the plurality of restricting members being configured to come into contact with the medium from above, wherein in an initial state in which the medium is not placed, a distance in a gravitational direction between a first end of each of the plurality of restricting members on a placement unit side and one of the plurality of placement surfaces that faces the first end in the gravitational direction is constant.

A recording system is a recording system including a recording device and a medium placement device, the recording device including a storage unit configured to store roll paper, a transport unit configured to transport a medium fed from the roll paper in the storage unit, a recording unit configured to perform recording onto the medium transported by the transport unit, a cutting unit configured to cut the medium on which recording was performed by the recording unit, and a discharge unit configured to discharge the medium cut by the cutting unit, and the medium placement device including a placement unit including a plurality of placement surfaces, with different angles with respect to a horizontal direction, that are disposed along a discharge direction of the medium, the placement unit being configured to have the medium discharged from the discharge unit placed thereon, and a plurality of restricting members disposed facing the placement unit along the discharge direction, the plurality of restricting members being configured to come into contact with the medium from above, wherein in an initial state in which the medium is not placed, a distance in a gravitational direction between a first end of each of the plurality of restricting members on a placement unit side and one of the plurality of placement surfaces that faces the first end in the gravitational direction is constant.

DESCRIPTION OF EXEMPLARY EMBODIMENTS

Figure 1:
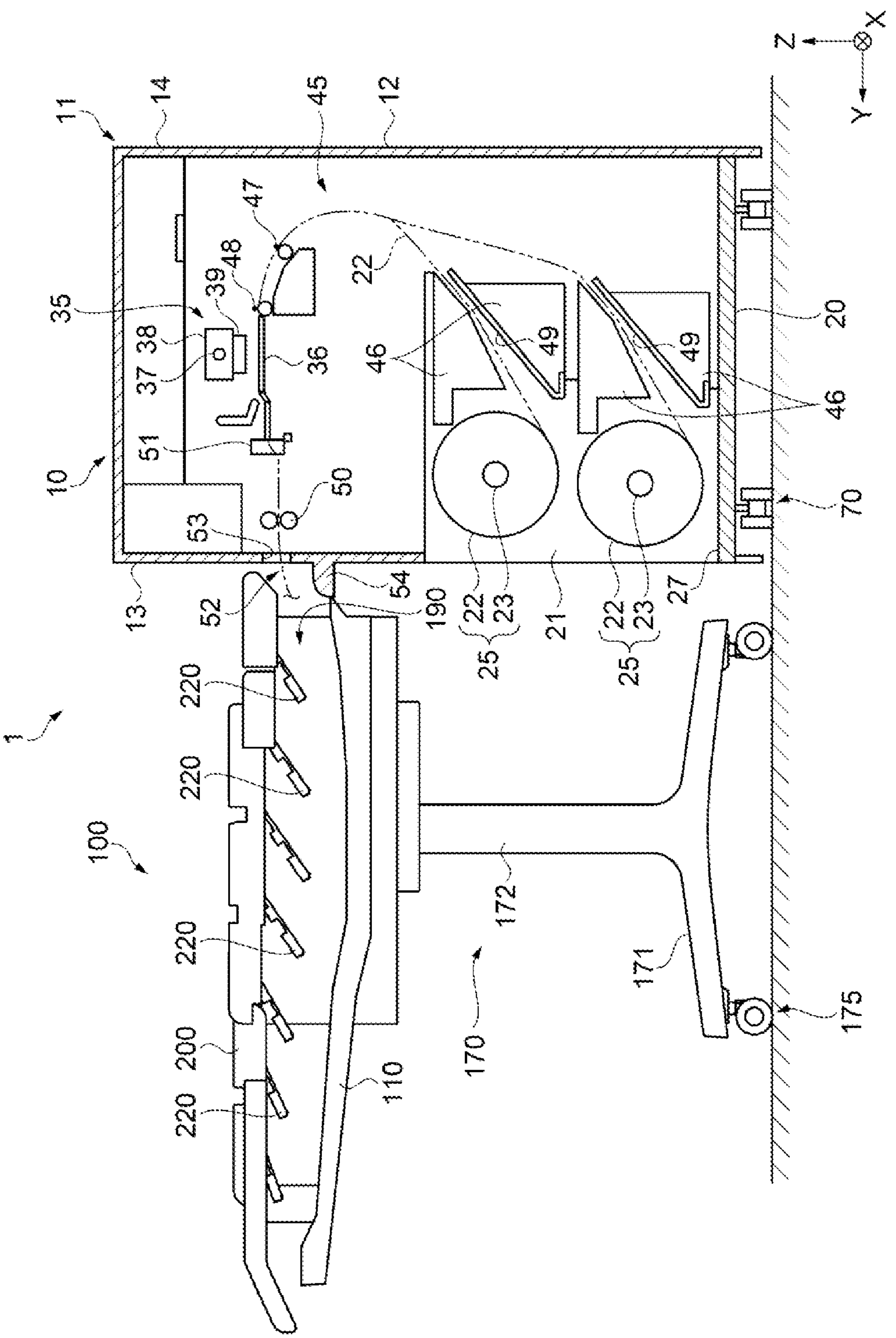
FIG. 1 is a schematic view illustrating a configuration of a recording system.

As illustrated in FIG. 1, a recording system 1 includes a recording device 10 (corresponding to a processing device) and a medium placement device 100. The recording device 10 is a device configured to carry out recording onto a medium 22 (for example, a sheet). The medium placement device 100 is a device configured to have the medium 22 discharged from the recording device 10 placed therein.

In FIG. 1, the direction along the X-axis indicates the width direction of the recording device 10 and the medium placement device 100; the direction along the Y-axis indicates the front and rear direction of the recording device 10 and the medium placement device 100; and the direction along the Z-axis indicates the height direction of the recording device 10 and the medium placement device 100.

The recording device 10 rotatably holds roll paper 25, which is the medium 22 wound on a core member 23, and ejects a liquid onto the surface of the medium 22 fed from the roll paper 25, thereby recording images and the like onto the medium 22. The recording device 10 is, for example, an ink jet-type large format printer configured to eject an ink, which is an example of the liquid, and thereby print onto the medium 22. A large format printer is, for example, a printer capable of carrying out printing onto a relatively large medium 22 such as those having a sheet size of A3 (297 mm×420 mm), A0 (841 mm×1189 mm), B0 Nobi (1118 mm×1580 mm), and the like.

The recording device 10 includes a main body 11 and a leg unit 70. The main body 11 includes a housing 12 having a generally cuboid shape. The housing 12 is coupled to a base frame 20, and the base frame 20 is supported by the leg unit 70.

The main body 11 includes a storage unit 21. The storage unit 21 accommodates the roll paper 25 having a cylindrical shape, which is the medium 22 wound on the core member 23. The storage unit 21 includes an opening 27 on a front wall 13 of the housing 12, and includes a space extending from the front wall 13 toward a rear wall 14. The storage unit 21 according to the present embodiment is configured to be able to accommodate two roll papers 25 with the two roll papers 25 being aligned in the height direction of the recording device 10. The roll paper 25 is removable from the main body 11 through the opening 27.

The roll paper 25 is rotatably held about the center axis of the core member 23 by a drive motor (not illustrated). Driving the drive motor in a forward direction causes the medium 22 wound on the roll paper 25 to be fed to the rear wall 14 side within the housing 12.

The main body 11 includes a recording unit 35 in the housing 12. The recording unit 35 includes a support 36, a guide shaft 37, a carriage 38, and a recording head 39.

The support 36 is disposed above the storage unit 21. The support 36 is a plate-shaped member extending in the width direction in the housing 12. Recording is made with the medium 22 fed from the roll paper 25 being supported on the support 36.

The guide shaft 37 is disposed above the support 36. The guide shaft 37 is a rod-shaped or plate-shaped member extending in the width direction. The guide shaft 37 supports the carriage 38 so as to be movable along the guide shaft 37. The carriage 38 is configured to be reciprocable along the guide shaft 37 by driving of a drive motor (not illustrated).

A recording head 39 is mounted on the carriage 38. The recording head 39 is disposed facing the support 36. The recording head 39 ejects an ink as droplets onto the medium 22 supported by the support 36, thereby carrying out recording onto the medium 22.

The main body 11 includes a transport unit 45 in the housing 12. The transport unit 45 transports the medium 22 fed from the roll paper 25. The transport unit 45 includes a transport path forming portion 46, intermediate rollers 47, transport rollers 48, and discharge rollers 50.

The intermediate rollers 47 and the transport rollers 48 are disposed upstream of the support 36 in the transport direction of the medium 22, while the discharge rollers 50 are disposed downstream of the support 36. The intermediate rollers 47 are disposed upstream of the transport rollers 48.

The transport path forming portions 46 are provided corresponding to each of the two roll papers 25. The transport path forming portion 46 is located on the rear wall 14 side with respect to each of the two roll papers 25 accommodated in the storage unit 21. The transport path forming portion 46 forms a transport path 49 configured to guide the medium 22 sent out from the roll paper 25 to the rear wall 14 side of the housing 12.

The intermediate rollers 47, the transport rollers 48, and the discharge rollers 50 transport the medium 22 that passed through the transfer path 49. The intermediate rollers 47, the transport rollers 48, and the discharge rollers 50 are a pair of rotatably supported rollers with a shaft along the width direction serving as a rotary shaft, and are constituted by a driving roller and a driven roller. Furthermore, each pair of the driving roller and the driven roller grip the medium 22 from the front and back surfaces for transport.

At the transport unit 45, driving of the drive motor (not illustrated) in the forward direction drives to rotate the intermediate rollers 47, the transport rollers 48, and the discharge rollers 50, thereby transporting the medium 22 through the transport path 49 to the support 36 as well as transporting the medium 22 on the support 36 from the rear wall 14 side to the front wall 13 side.

Note that FIG. 1 illustrates a state in which the medium 22 is being sent out from both of the two roll papers 25; during actual recording, however, the medium 22 is transported from only one of the two roll papers 25.

A cutting unit 51 is disposed downstream of the recording unit 35. The cutting unit 51 cuts the recorded medium 22 to a predetermined length. The medium 22 cut by the cutting unit 51 is transported to the discharge unit 52 side by the discharge rollers 50 disposed downstream of the cutting unit 51.

The discharge unit 52 includes a discharge port 53, which is an opening through the front wall 13. The cut medium 22 is discharged from the discharge port 53. In addition, the discharge unit 52 includes a protrusion 54 below the discharge port 53, the protrusion 54 protruding from the front wall 13 in the +Y direction.

The medium placement device 100 is disposed in the +Y direction of the recording device 10. The medium 22 discharged from the discharge unit 52 is placed in the medium placement device 100.

Here, because it is fed from the state of the roll paper 25, the medium 22 discharged from the discharge unit 52 has a curl to it and thus is discharged in a curled state with an upwardly convex shape (curved shape).

Thus, for example, in a configuration in which a placement surface configured to have the medium 22 placed thereon in the horizontal direction is included, or a configuration in which the downstream end side of the placement surface is simply inclined upward, the medium 22 is placed in a state in which the central portion of the medium 22 in the discharge direction is lifted upward with respect to the placement surface. Furthermore, when the next medium 22*a* (22) is discharged in this state and comes into contact with the already placed medium 22, the placement position of the already placed medium 22 is prone to be shifted, tending to cause a transport jam or stacking failure.

Therefore, the medium placement device 100 according to the present embodiment includes a configuration capable of suppressing the above-described malfunctions from occurring. A specific configuration of the medium placement device 100 will be described below.

Figure 2:
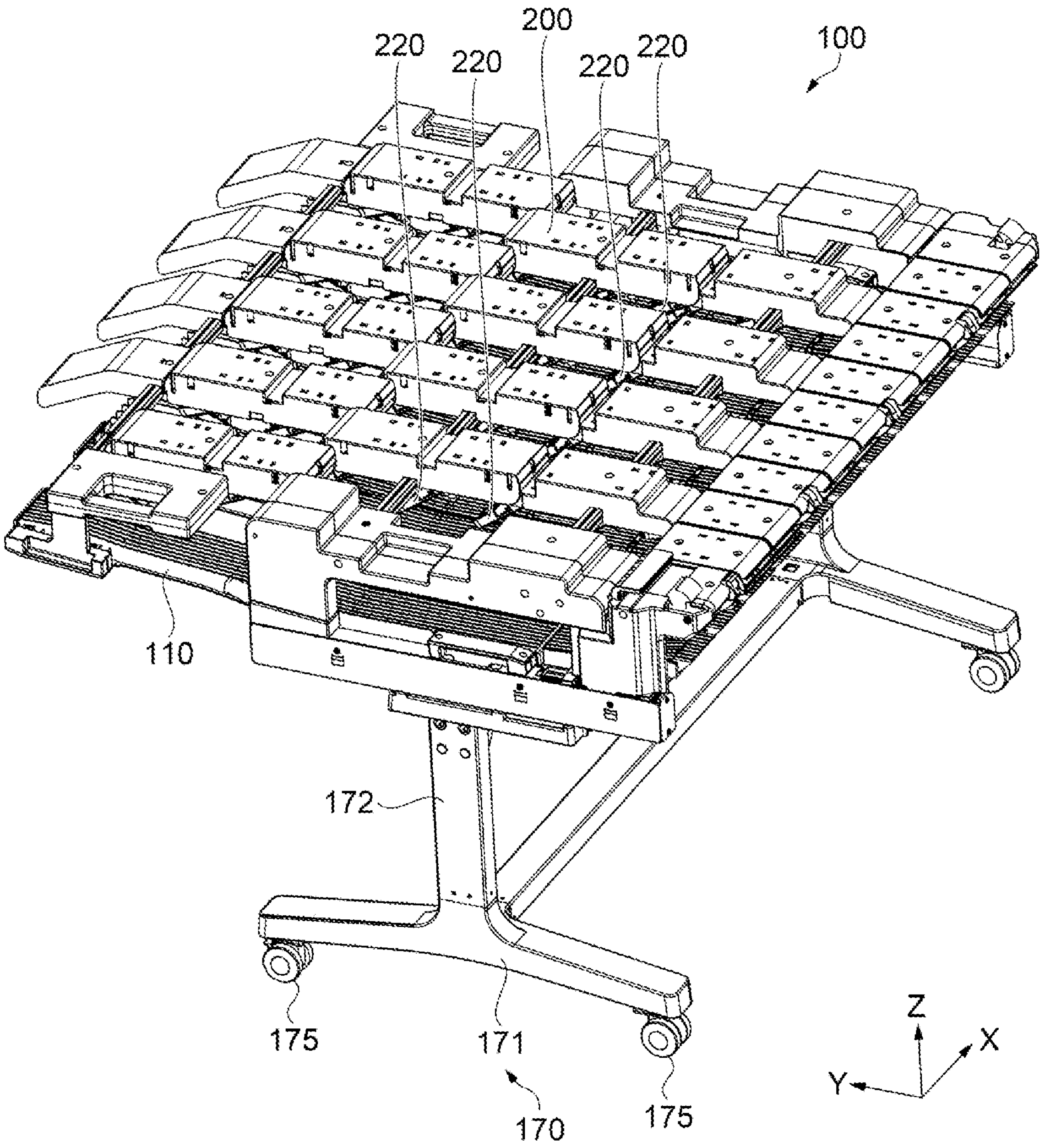
FIG. 2 is an overall perspective view illustrating a configuration of a medium placement device.

As illustrated in FIG. 1 and FIG. 2, the medium placement device 100 includes a placement unit 110 and a restricting member 220.

The placement unit 110 is for having the medium 22 discharged from the discharge unit 52 placed thereon. The medium placement device 100 according to the present embodiment is capable of having a medium 22 of various sizes placed therein. For example, a medium 22 such as those having a sheet size of A3 (297 mm×420 mm), A0 (841 mm×1189 mm), B0 Nobi (1118 mm×1580 mm), and the like can be placed. The dimension of the placement unit 110 in the width direction is greater than the dimension of the maximum sheet size (B0 Nobi, for example) discharged from the recording device 10 in the width direction.

The placement unit 110 is supported by a leg unit 170. The leg unit 170 is disposed below the placement unit 110. The leg unit 170 includes a base portion 171, and a pillar 172 erected on the base portion 171 to support the placement unit 110. In addition, a caster 175 is connected to the lower portion of the base portion 171. The caster 175 includes a rotatable wheel, a swivel portion configured to allow the wheel to swivel, and a stopper configured to restrict the rotation of the wheel. Accordingly, the medium placement device 100 is configured to be movable separately from the recording device 10. In this manner, the recording system 1 includes the medium placement device 100 as a separate article from the recording device 10, which makes it possible to place a plurality of cut media 22.

The medium placement device 100 is disposed at a position where the end of the placement unit 110 in the −Y direction is close to (in contact with or set apart by a slight gap from) the end of the protrusion 54 of the recording device 10 in the +Y direction.

Figure 3:
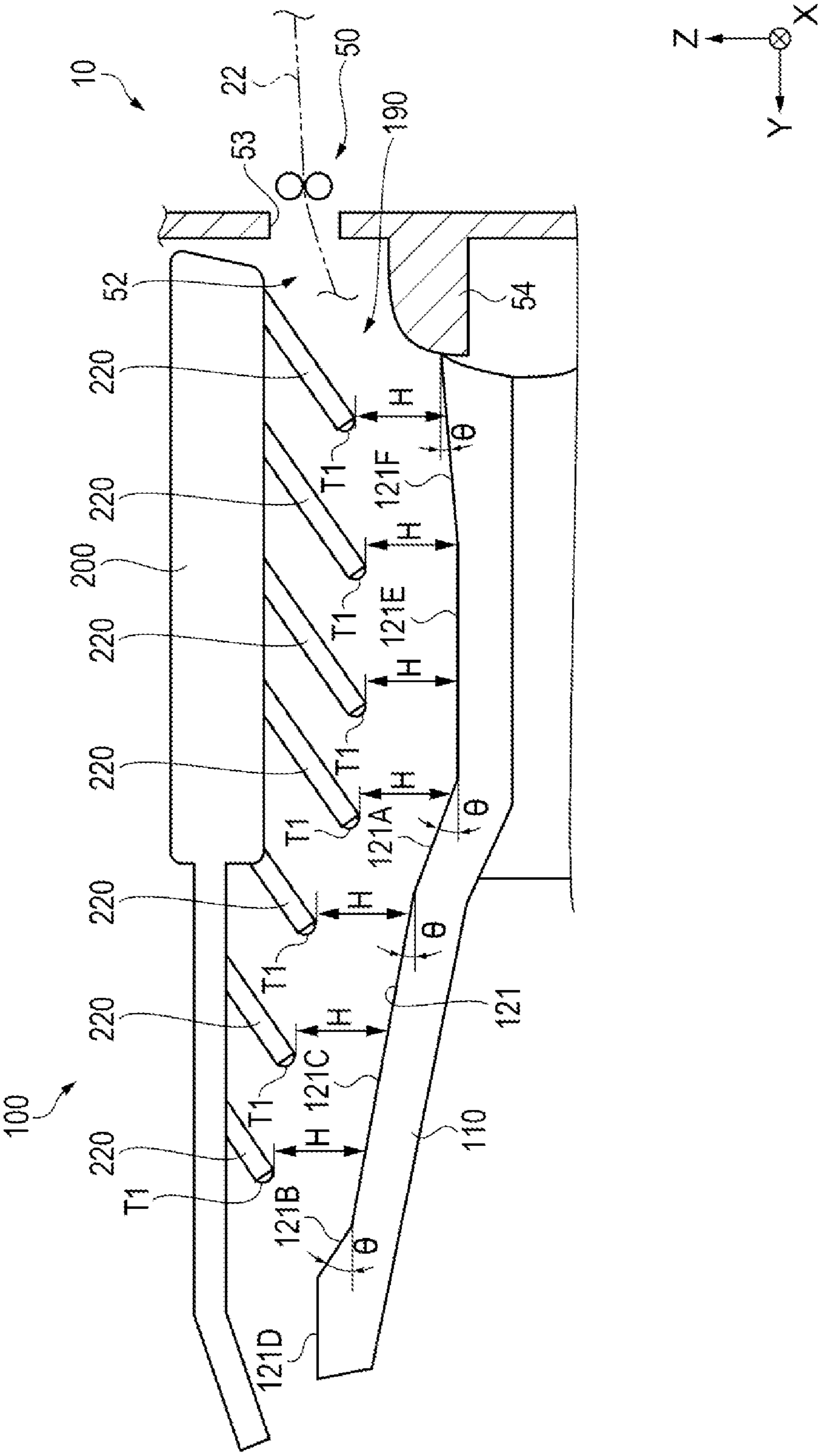
FIG. 3 is a schematic view illustrating a configuration of a medium placement device.

As illustrated in FIG. 3, the placement unit 110 includes a plurality of placement surfaces 121 having a different angle with respect to the horizontal direction. These placement surfaces 121 are disposed along the discharge direction of the medium 22 (the orientation of the +Y direction from the discharge port 53).

The placement surface 121 according to the present embodiment includes a first placement surface 121A to a sixth placement surface 121F. Specifically, the placement surface 121 includes a first placement surface 121A inclined upward toward the downstream of the discharge direction of the medium 22, a second placement surface 121B disposed downstream of the first placement surface 121A and inclined upward toward the downstream, a third placement surface 121C disposed between the first placement surface 121A and the second placement surface 121B, and a fourth placement surface 121D disposed downstream of the second placement surface 121B. Furthermore, the inclination angles of the third placement surface 121C and the fourth placement surface 121D with respect to the horizontal direction is smaller than the inclination angles of the first placement surface 121A and the second placement surface 121B with respect to the horizontal direction.

Moreover, in the present embodiment, the placement surface 121 includes a fifth placement surface 121E upstream of the first placement surface 121A, and a sixth placement surface 121F upstream of the fifth placement surface 121E.

In the present embodiment, the sixth placement surface 121F is disposed at the upstream end of the placement unit 110. The upstream end of the sixth placement surface 121F is located below the discharge port 53 of the recording device 10, and is disposed at a position close to the end of the protrusion 54 in the +Y direction. In addition, the fourth placement surface 121D is disposed at the downstream end of the placement unit 110.

The inclination angle of the first placement surface 121A with respect to the horizontal direction is approximately 8°. The inclination angle of the second placement surface 121B with respect to the horizontal direction is approximately 10°. The inclination angle of the third placement surface 121C with respect to the horizontal direction is approximately 5°. The fourth placement surface 121D and the fifth placement surface 121E have an inclination angle of 0° with respect to the horizontal direction. The inclination angle of the sixth placement surface 121F with respect to the horizontal direction is −2.5°, for example.

In this manner, the first placement surface 121A is formed starting from a position approximately half-way of the total length of the placement unit 110 along the +Y direction, with the placement surface 121 being inclined upward toward the downstream.

A restricting frame 200 is disposed facing the placement unit 110. As illustrated in FIG. 3, the restricting frame 200 is disposed facing the placement unit 110 so as to cover the placement surface 121 in a side view. At the end of the medium placement device 100 in the −Y direction, an introduction port 190 is provided between the placement unit 110 and the restricting frame 200 for introducing the medium 22 discharged from the discharge unit 52 of the recording device 10 into the medium placement device 100. The medium 22 introduced from the introduction port 190 is transported between the placement unit 110 and the restricting frame 200 along the discharge direction.

A plurality of restricting members 220 are disposed facing the placement surface 121 of the placement unit 110 along the discharge direction. The restricting member 220 is configured to be capable of coming into contact with the medium 22 from above. The restricting member 220 according to the present embodiment has a plate shape. Furthermore, in the initial state in which the medium 22 is not placed on the placement unit 110, the distance H in the gravitational direction (the direction along the Z-axis) between a first end T1 of each regulating member 220 on the placement unit 110 side (the end in the −Z direction) and the placement surface 121 that faces each regulating member 220 in the gravitational direction (the first placement surface 121A to the sixth placement surface 121F) is made constant.

Making the distance H between the first end T1 of each restricting member 220 and the placement surface 121 constant allows the curled medium 22 to be efficiently held down from the upstream to the downstream in the discharge direction of the medium 22. This improves the dischargeability (transportability) of the medium 22, allowing transport jam and stacking failure to be suppressed.

The distance H between each restricting member 220 and the placement surface 121 can be set as appropriate based on the form of the medium 22 to be discharged (for example, the magnitude of curl) and the like. Note that when the distance H is great, it is difficult to hold down the curled medium 22 by restricting members 220. In addition, when the distance H is small, the contact pressure of the restricting member 220 with respect to the medium 22 increases, which may cause damage to the medium 22 or stacking failure. The distance H is set in consideration of such malfunctions. For example, when a relatively large medium 22 (e.g., B0 Nobi) is to be placed, the distance H may be set to approximately 30 mm.

In addition, the restricting members 220 are disposed at substantially equal intervals along the discharge direction. This allows the curled medium 22 to be uniformly held down from the upstream to the downstream in the discharge direction of the medium 22.

In addition, a plurality of restricting members 220 are also disposed in the width direction that intersects with the discharge direction (see FIG. 2). This makes it possible to restrict the curled medium 22 across the entirety of the discharge direction and the width direction. In addition, compared to a configuration in which the restricting members 220 extend in the width direction, an increase in the contact pressure of the restricting member 220 with respect to the medium 22 can be alleviated, allowing damage and the like to the medium 22 to be prevented.

Figure 4:
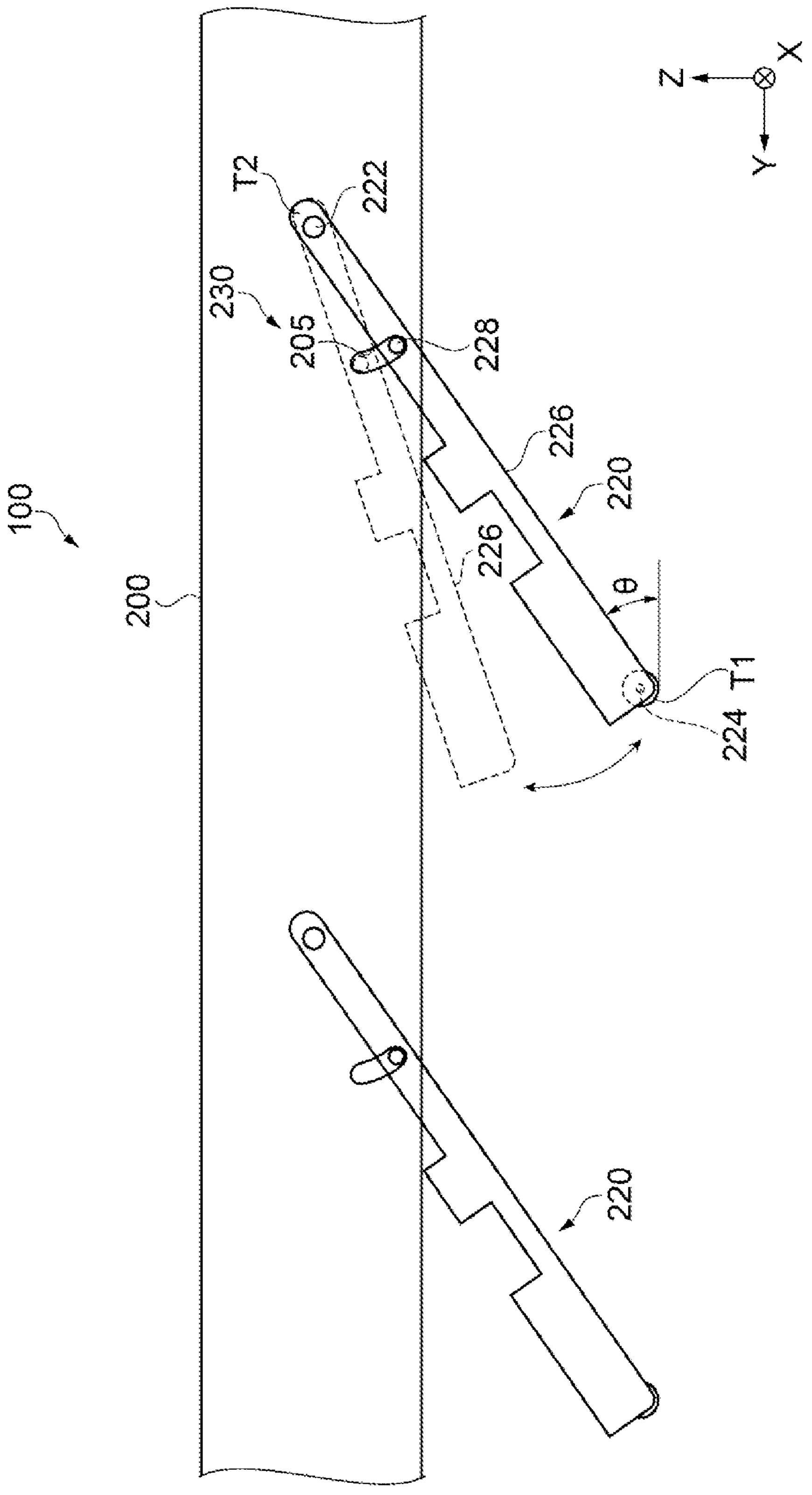
FIG. 4 is a partially enlarged view illustrating a configuration of a restricting member.

As illustrated in FIG. 4, a rotating member 224 is provided at the first end T1 of each restricting member 220. The rotating member 224 is, for example, a driven roller configured to rotate about a rotary shaft extending in the direction along the X-axis. The rotating member 224 is configured to be rotatable when coming into contact with the medium 22 transported in the discharge direction. The rotating member 224 reduces the contact resistance between the first end T1 of the restricting member 220 and the medium 22, allowing the transportability of the medium 22 to be improved. In addition, damage caused by contact with the medium 22 can be prevented.

In addition, the first end T1 of each regulating member 220 is configured to be displaceable upward, opposite to the placement surface 121, from the position of the initial state. Moreover, each restricting member 220 is individually displaceable. This suppresses excessive pressing pressure with respect to the medium 22, allowing damage to the medium 22 to be prevented. In addition, medium 22 can be appropriately held down in response to the state of curl across the entire surface of the medium 22, and the number of media loaded onto the placement surface 121.

At the second end T2 disposed upstream of the first end T1 of each restricting member 220, a rotating shaft 222 extending in the direction along the X-axis is provided, with the rotating shaft 222 being rotatably supported by the restricting frame 200. Furthermore, rotation of each restricting member 220 about the rotating shaft 222 makes the first end T1 displaceable downstream and upward.

Each restricting member 220 includes an abutting surface 226 between the second end T2 and the first end T1, the abutting surface 226 being capable of coming to abut on the medium 22. The abutting surface 226 is provided on the upstream side of the restricting member 220. The abutting surface 226 is a flat surface. In addition, each restricting member 220 includes a regulating portion 230 configured to regulate the angle of the abutting surface 226 at the position of the initial state to a predetermined angle.

A shaft 228 extending in the direction along the X-axis is provided between the first end T1 and the second end T2 of each restricting member 220. The regulating portion 230 is provided on the restricting frame 200, and includes a guide hole 205 configured to regulate the movement range of the shaft 228. The shaft 228 is supported so as to be movable along the guide hole 205.

In the initial state, the first end T1 of the restricting member 220 is located downward by its own weight. At this time, the shaft 228 of the restricting member 220 is supported by the lower end of the guide hole 205. This causes the angle of the abutting surface 226 in the initial state to be regulated to the predetermined angle.

In addition, when the restricting member 220 comes into contact with the medium 22 in the initial state, the pressing pressure of the medium 22 against the restricting member 220 causes the first end T1 of the restricting member 220 to depart downstream and upward. At this time, when the shaft 228 of the restricting member 220 comes into contact with the upper end of the guide hole 205, the first end T1 of the restricting member 220 is restricted from moving downstream and upward.

In addition, causing the tip portion of the discharged medium 22 to abut on the abutting surface 226 allows the medium 22 to be easily lead downstream.

Note that a pressing member configured to press the first end T1 of each restricting member 220 downward may be installed. The pressing member is, for example, a spring. Pressing each restricting member 220 downward from above allows the curl of a medium 22 having high rigidity to be reliably held down, for example.

In the initial state, the predetermined angle θ formed between the abutting surface 226 of each restricting member 220 and the horizontal direction is constant. The angle θ is, for example, no less than 30° and no more than 40°. The angle θ according to the present embodiment is 35°. The predetermined angle θ is regulated by the guide hole 205. This allows the abutting surface 226 to come into contact with the curled medium 22 at a substantially constant angle and easily lead the tip of the medium 22 downstream.

Note that in the initial state, the angle formed between the abutting surface 226 of each restricting member 220 and the placement surface 121 that faces the abutting surface 226 (the first placement surface 121A to the sixth placement surface 121F) may be constant. In this case, the angle between the abutting surface 226 of each restricting member 220 and the placement surface 121 that faces the abutting surface 226 is approximately 35°. In this manner, the tip of the curled medium 22 can also be easily lead downstream.

Next, functions and effects of the medium placement device 100 will be described. Note that in the present embodiment, a case in which a medium 22 longer than the total length of the medium placement device 100 (for example, B0 Nobi) is placed on the placement unit 110 will be described.

When the curled medium 22 is discharged from the discharge unit 52, the medium 22 is introduced from the introduction port 190 of the medium placement device 100, and is transported downstream in the discharge direction.

Figure 5:
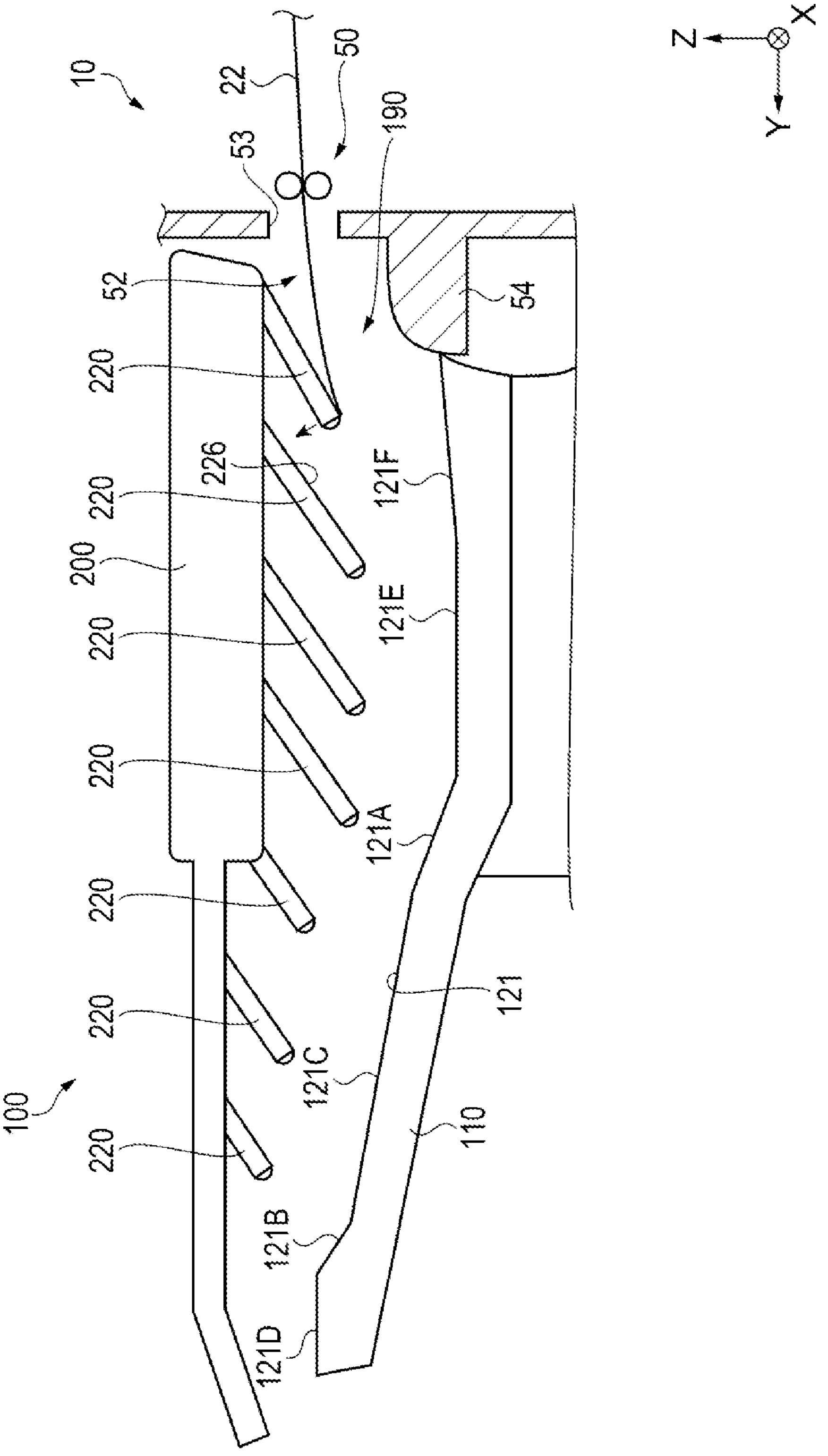
FIG. 5 is a schematic view illustrating a discharge state of a medium.

As illustrated in FIG. 5, first, the tip portion of the medium 22 introduced from the introduction port 190 comes to abut on the abutting surface 226 of the restricting member 220 disposed at the end in the −Y direction. When the medium 22 comes to abut on the abutting surface 226, the first end T1 of the restricting member 220 departs downstream and upward, with the rotating shaft 222 serving as the center. When the medium 22 comes to abut on the abutting surface 226, the medium 22 moves downward along the surface direction of the abutting surface 226, and is lead downstream. In addition, the rotating member 224 provided at the first end T1 of the restricting member 220 causes the medium 22 to be smoothly transported downstream.

Figure 6:
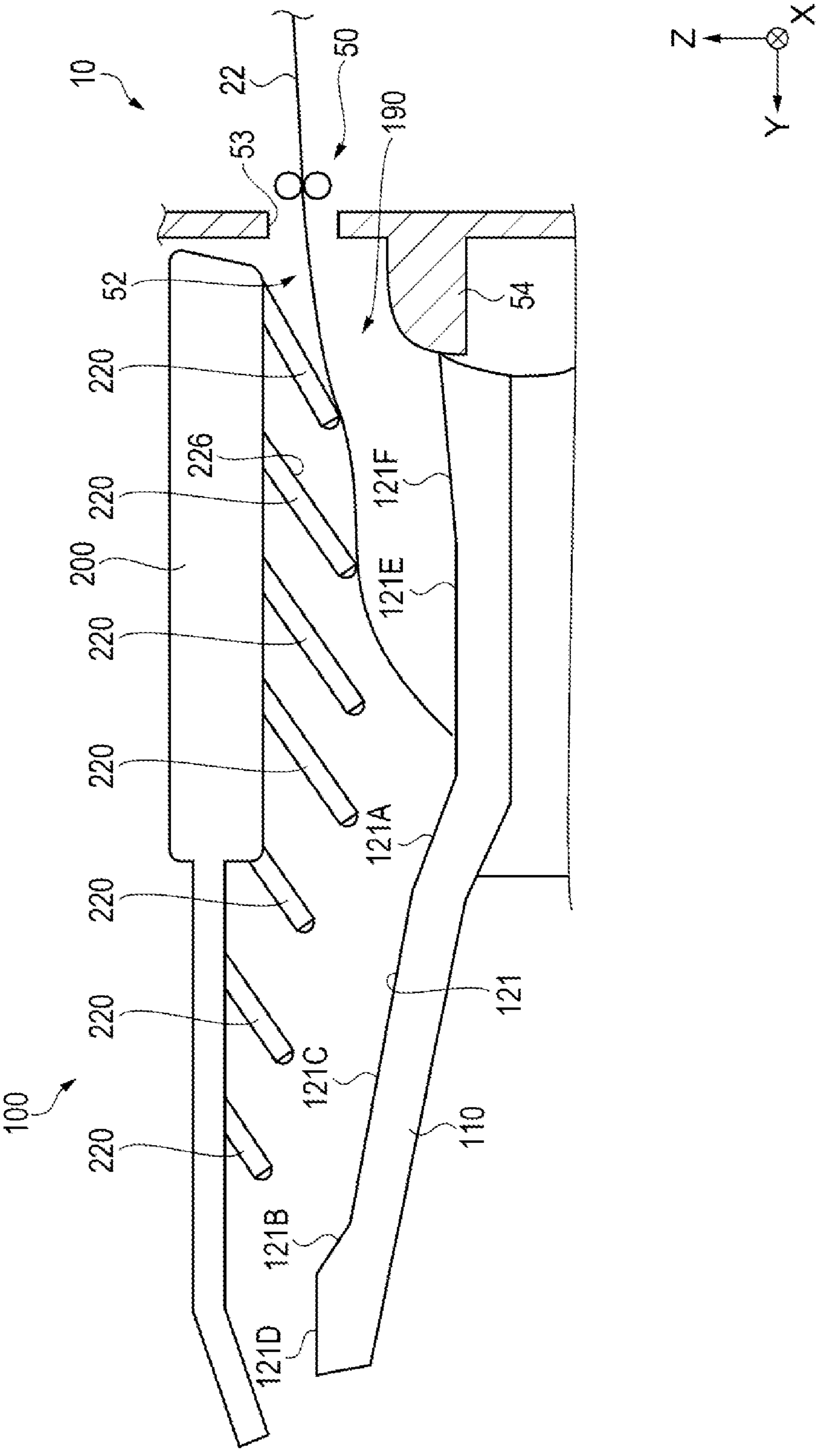
FIG. 6 is a schematic view illustrating a discharge state of a medium.

Furthermore, as illustrated in FIG. 6, in the process in which the medium 22 is transported in the discharge direction, the first end T1 of each restricting member 220 presses the medium 22 downward from above. This causes the medium 22 to be transported in the discharge direction while being decurled.

Figure 7:
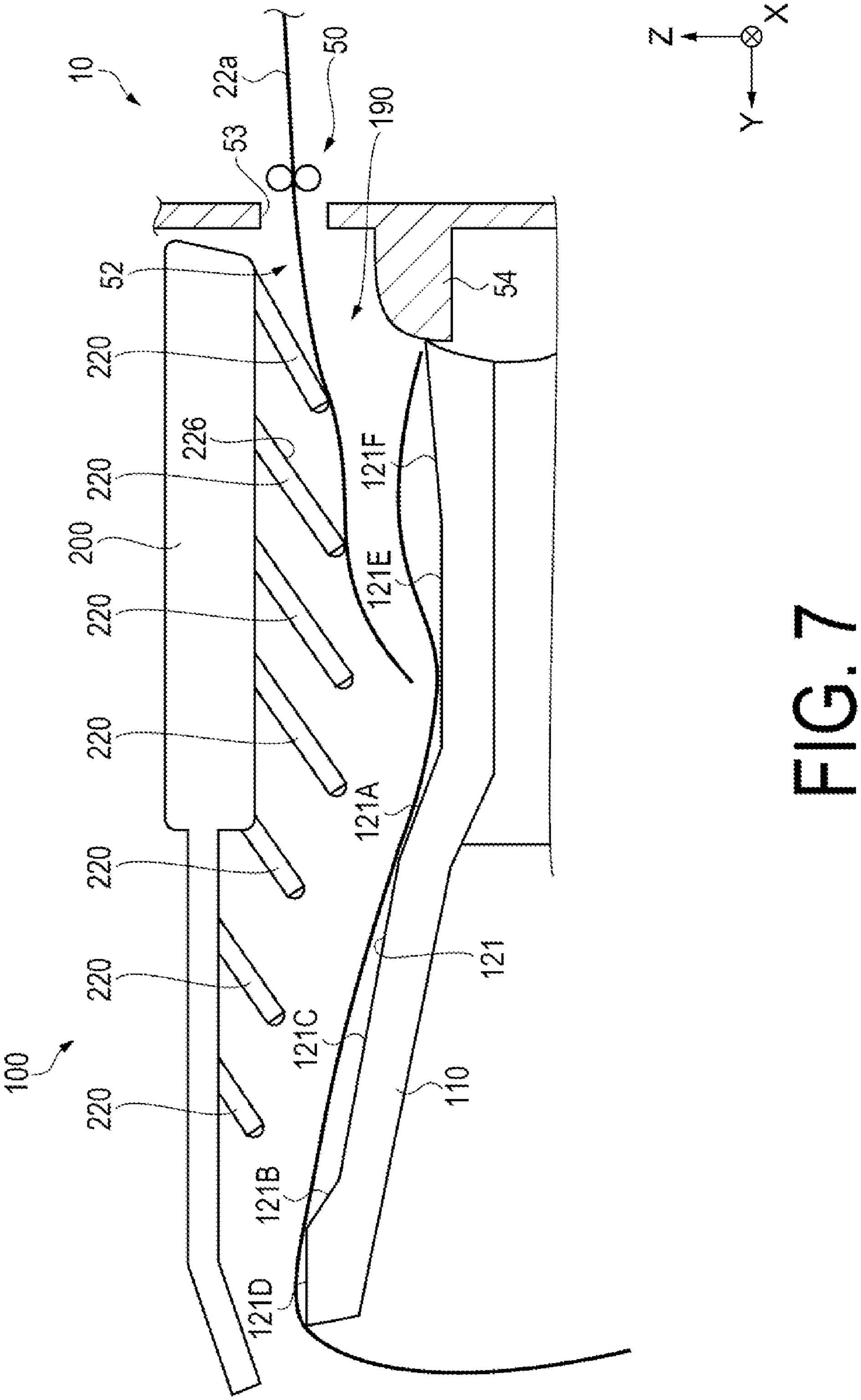
FIG. 7 is a schematic view illustrating a discharge state of a medium.

In this manner, when the medium 22 is completely discharged from the discharge unit 52, the medium 22 is placed on the placement unit 110, with a downstream portion of the medium 22 in the discharge direction of the medium 22 hanging downward from the end of the fourth placement surface 121D in the +Y direction, as illustrated in FIG. 7. Next, the next medium **22*a* (22) is discharged anew from the discharge unit 52. In the same manner, the next medium 22*a* also comes into contact with the restricting member 220, and is transported in the discharge direction while being decurled. Furthermore, the next medium 22*a* is placed on the already placed medium 22**.

As described above, according to the present embodiment, the medium 22 is transported while being decurled, allowing transport jam and stacking failure to be suppressed. Furthermore, it is possible to place a large volume of curled media 22 having high rigidity on the medium placement device 100.

Note that while each restricting member 220 is disposed at substantially equal intervals along the discharge direction in the present embodiment, the present disclosure is not limited thereto. For example, the restricting members 220 may be disposed such that the spacing between the restricting members 220 is narrower downstream in the discharge direction than upstream in the discharge direction. This allows curl to be further alleviated because the discharged medium 22 is sometimes more curled downstream than upstream.

What is claimed is:

1. A medium placement device configured to have a medium discharged from a discharge unit of a processing device placed therein, the medium placement device comprising:

a placement unit including a plurality of placement surfaces, with different angles with respect to a horizontal direction, that are disposed along a discharge direction of the medium, the placement unit being configured to have the medium discharged from the discharge unit placed thereon; and a plurality of restricting members disposed facing the placement unit along the discharge direction, the plurality of restricting members being configured to come into contact with the medium from above; wherein in an initial state in which the medium is not placed, a distance in a gravitational direction between a first end of each of the plurality of restricting members on a placement unit side and one of the plurality of placement surfaces that faces the first end in the gravitational direction is constant and the plurality of placement surfaces provide a concave medium receiving area, and wherein each of the plurality of restricting members includes a second end;

an abutting surface between the second end and the first end, the abutting surface being configured to abut on the medium; and a regulating portion configured to regulate an angle of the abutting surface at a position of the initial state to a predetermined angle, the regulating portion guiding the abutting surface along a guide path extending through the restricting member at a location between the first end and an axis of rotation of the restricting member.

2. The medium placement device according to claim 1, comprising a rotating member provided at the first end of each of the plurality of restricting members.

3. The medium placement device according to claim 1, wherein the restricting member is also disposed in plurality in a width direction that intersects with the discharge direction.

4. The medium placement device according to claim 1, wherein the first end of each restricting member is configured to displace upward, opposite to the one of the plurality of placement surfaces, from the position of the initial state.

5. The medium placement device according to claim 4, wherein each of the plurality of restricting members is configured to displace individually.

6. The medium placement device according to claim 4, comprising a restricting frame disposed facing the placement unit; wherein the second end disposed upstream of the first end of each of the plurality of restricting members is rotatably supported by the restricting frame as a rotating shaft and rotation of each of the plurality of restricting members about the rotating shaft causes the first end to displace downstream and upward.

7. The medium placement device according to claim 6, wherein each of the plurality of restricting members includes a pressing member configured to press the first end downward.

8. The medium placement device according to claim 1, wherein, in the initial state, the predetermined angle formed between the abutting surface of each of the plurality of restricting members and the horizontal direction is constant.

9. The medium placement device according to claim 1, wherein, in the initial state, an angle formed between the abutting surface of each of the plurality of restricting members and the one of the plurality of placement surfaces that faces the abutting surface is constant.

10. A recording system comprising a recording device and a medium placement device, the recording device including a storage unit configured to store roll paper, a transport unit configured to transport a medium fed from the roll paper in the storage unit, a recording unit configured to perform recording onto the medium transported by the transport unit, a cutting unit configured to cut the medium on which recording was performed by the recording unit, and a discharge unit configured to discharge the medium cut by the cutting unit; and the medium placement device including a placement unit including a plurality of placement surfaces, with different angles with respect to a horizontal direction, that are disposed along a discharge direction of the medium, the placement unit being configured to have the medium discharged from the discharge unit placed thereon and a plurality of restricting members disposed facing the placement unit along the discharge direction, the plurality of restricting members being configured to come into contact with the medium from above; wherein in an initial state in which the medium is not placed, a distance in a gravitational direction between a first end of each of the plurality of restricting members on a placement unit side and one of the plurality of placement surfaces that faces the first end in the gravitational direction is constant and the plurality of placement surfaces provide a concave medium receiving area, and wherein each of the plurality of restricting members includes a second end;

an abutting surface between the second end and the first end, the abutting surface being configured to abut on the medium; and a regulating portion configured to regulate an angle of the abutting surface at a position of the initial state to a predetermined angle, the regulating portion guiding the abutting surface alone a guide path extending through the restricting member at a location between the first end and an axis of rotation of the restricting member.

* * * * *